(12) United States Patent
Hanada

(10) Patent No.: US 10,761,720 B2
(45) Date of Patent: Sep. 1, 2020

(54) DISPLAY CONTROL DEVICE, DISPLAY CONTROL METHOD, AND COMPUTER-READABLE STORAGE MEDIUM NON-TRANSITORILY STORING DISPLAY CONTROL PROGRAM

(71) Applicant: KYOCERA Document Solutions Inc., Osaka (JP)

(72) Inventor: Naoto Hanada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 56 days.

(21) Appl. No.: 16/033,859

(22) Filed: Jul. 12, 2018

(65) Prior Publication Data

US 2019/0026018 A1 Jan. 24, 2019

(30) Foreign Application Priority Data

Jul. 19, 2017 (JP) ................. 2017-139974

(51) Int. Cl.
*G06F 3/0488* (2013.01)
*G06F 3/0482* (2013.01)
*H04N 1/00* (2006.01)

(52) U.S. Cl.
CPC ........ *G06F 3/04883* (2013.01); *G06F 3/0482* (2013.01); *G06F 3/04886* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 5,977,948 A | * | 11/1999 | Nishibori | G06F 3/0236 345/467 |
| 6,603,708 B2 | * | 8/2003 | Tamagawa | G04G 21/00 345/168 |
| 8,816,966 B2 | * | 8/2014 | Yoshida | G06F 3/04886 345/171 |
| 10,198,179 B2 | * | 2/2019 | Ukai | G06F 3/0482 |
| 2005/0140661 A1 | * | 6/2005 | Collins | G06F 3/0482 345/173 |
| 2009/0322692 A1 | * | 12/2009 | Kim | G06F 3/0236 345/173 |
| 2010/0241993 A1 | * | 9/2010 | Chae | G01C 21/3611 715/830 |
| 2011/0037775 A1 | * | 2/2011 | Park | G06F 3/0233 345/592 |
| 2011/0291940 A1 | * | 12/2011 | Ghassabian | G06F 1/1626 345/169 |

(Continued)

FOREIGN PATENT DOCUMENTS

JP 2014-068236 A 4/2014

*Primary Examiner* — Chad M Dicke
(74) *Attorney, Agent, or Firm* — Studebaker & Brackett PC

(57) ABSTRACT

A display control device includes a touch panel and a controller. The controller includes a display section and a receiving section. The display section displays at least one object on the touch panel. The receiving section receives a slide operation on one object of the at least one object. When the slide operation is received by the receiving section, the display section determines, based on the slide operation, a character corresponding to the one object and displays the character on the touch panel.

10 Claims, 9 Drawing Sheets

(56) References Cited

U.S. PATENT DOCUMENTS

| | | | |
|---|---|---|---|
| 2013/0241838 A1* | 9/2013 | Onishi | G06F 3/0236 345/169 |
| 2014/0132519 A1* | 5/2014 | Chun | G06F 3/04886 345/168 |
| 2015/0058785 A1* | 2/2015 | Ookawara | G06F 3/04886 715/773 |
| 2015/0212726 A1* | 7/2015 | Yamasaki | G06F 3/04883 715/773 |
| 2016/0041703 A1* | 2/2016 | Nishibori | G06F 3/0482 715/784 |
| 2016/0041965 A1* | 2/2016 | Ghassabian | G06F 3/005 715/261 |
| 2017/0228123 A1* | 8/2017 | Ghassabian | G06F 1/1626 |
| 2019/0026016 A1* | 1/2019 | Hanada | G06F 3/04883 |
| 2019/0026018 A1* | 1/2019 | Hanada | G06F 3/04883 |

* cited by examiner

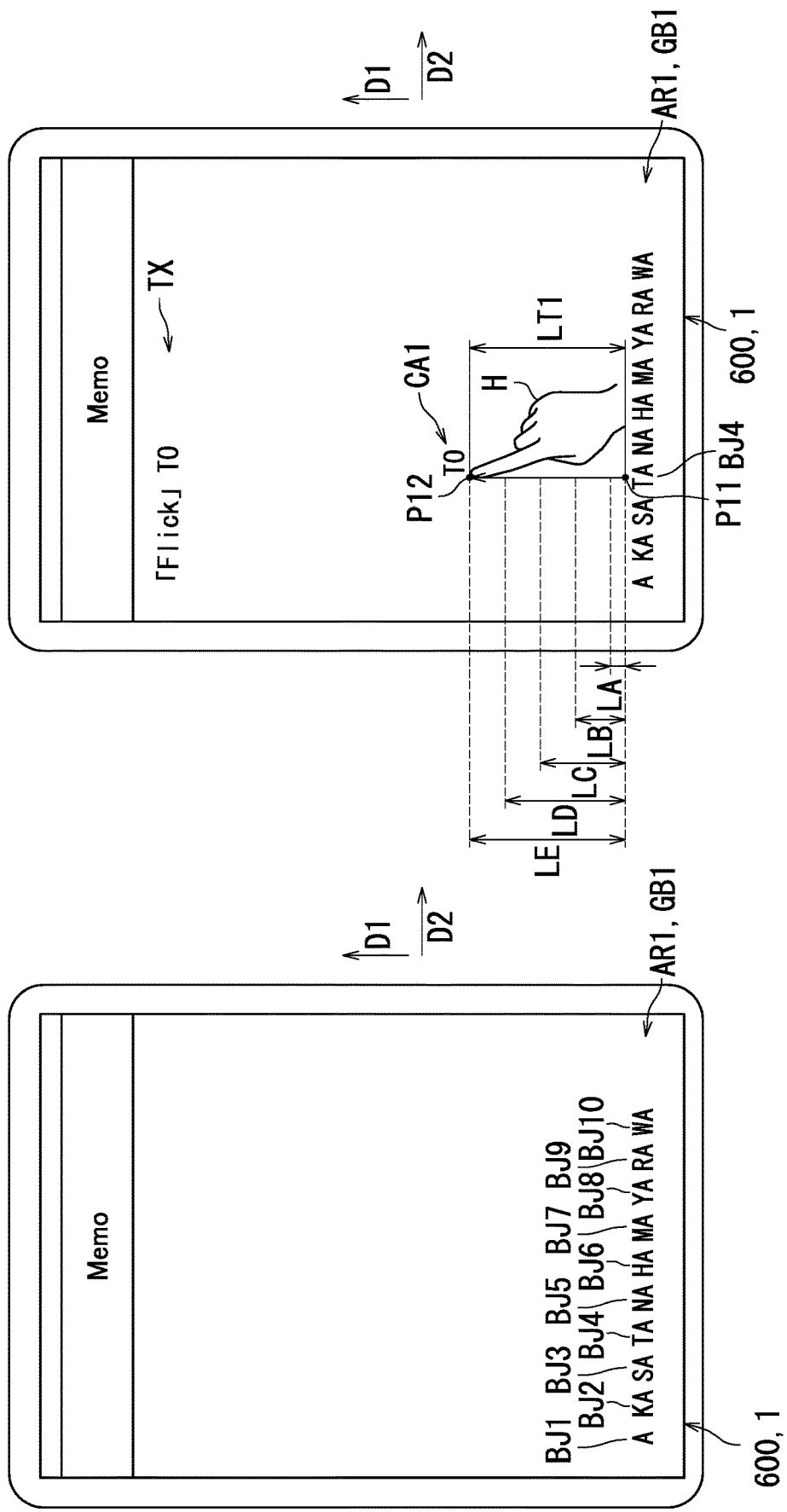

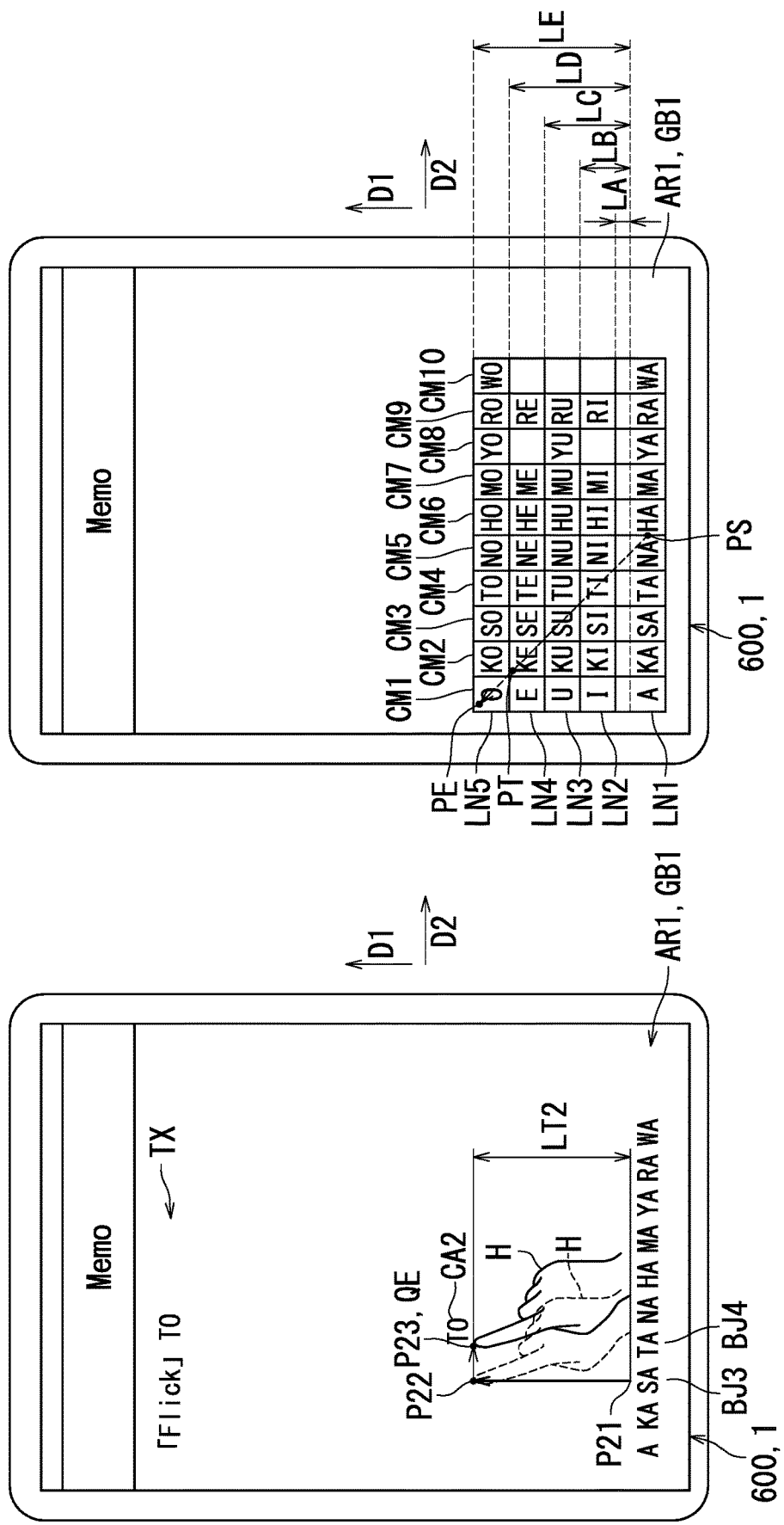

DISPLAY CONTROL DEVICE, DISPLAY CONTROL METHOD, AND COMPUTER-READABLE STORAGE MEDIUM NON-TRANSITORILY STORING DISPLAY CONTROL PROGRAM

INCORPORATION BY REFERENCE

The present application claims priority under 35 U.S.C. § 119 to Japanese Patent Application No. 2017-139974, filed on Jul. 19, 2017. The contents of this application are incorporated herein by reference in their entirety.

BACKGROUND

The present disclosure relates to a display control device, a display control method, and a computer-readable storage medium non-transitorily storing display control program.

Some smartphone includes a touch panel, a first display section, a second display section, a third display section, and a determination section. The first display section displays a slide bar at an end of a screen displayed on the touch panel along a side of the screen. The second display section detects a point on the slide bar touched by a user and displays an input candidate character in the vicinity of the point. The third display section detects the slide bar being slid by the user and displays the input candidate character by changing its position and display content according to a point to which the slide bar is slid. The determination section detects a region where the input candidate character is displayed being touched by the user for at least a predetermined period and determines the touched input candidate character as a character to be entered. The input candidate character is any one of 46 characters included in the Japanese syllabary.

SUMMARY

A display control device according to the present disclosure includes a touch panel, a display section, and a receiving section. The display section displays at least one object on the touch panel. The receiving section receives a slide operation on one object of the at least one object. When the slide operation is received by the receiving section, the display section determines, based on the slide operation, a character corresponding to the one object and displays the character on the touch panel.

A display control method according to the present disclosure is executed by a display control device including a touch panel. The display control method includes displaying by the display control device at least one object on the touch panel. The display control method includes receiving by the display control device a slide operation on one object of the at least one object. The display control method includes, upon reception of the slide operation, determining by the display control device, based on the slide operation, a character corresponding to the one object and displaying the character on the touch panel.

A computer-readable storage medium non-transitorily storing therein a display control program according to the present disclosure is configured as follows. That is, in a display control device including a touch panel and a computer, the display control program causes the computer to display at least one object on the touch panel. The display control program causes the computer to receive a slide operation on one object of the at least one object. Upon reception of the slide operation, the display control program causes the computer to determine, based on the slide operation, a character corresponding to the one object and display the character on the touch panel.

BRIEF DESCRIPTION OF THE DRAWINGS

FIG. 3A is a screen diagram illustrating an example of a character input screen. FIG. 3B is a screen diagram illustrating an example of a slide operation performed on the character input screen.

FIG. 4A is a screen diagram illustrating another example of the slide operation performed on the character input screen. FIG. 4B is a screen diagram illustrating an example of a relationship between a touch point and a character to be determined.

DETAILED DESCRIPTION

Figure 1:
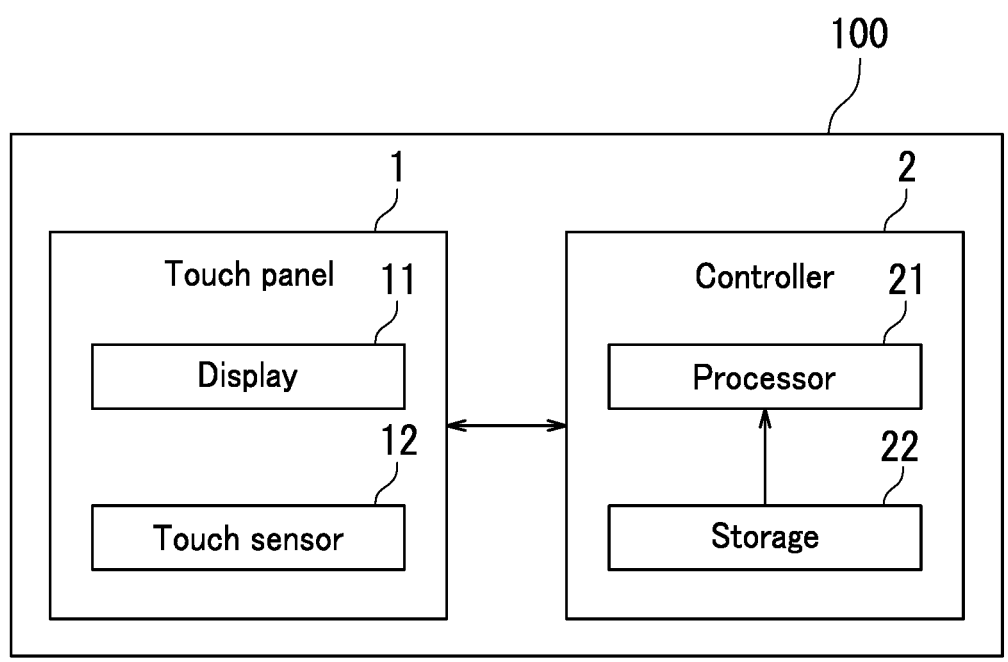
FIG. 1 is a diagram illustrating a configuration of a smartphone according to a first embodiment of the present disclosure.

The following describes embodiments of the present disclosure with reference to the accompanying drawings (FIGS. 1 to 9). Note that elements that are the same or equivalent are labelled using the same reference signs in the drawings, and explanation of which is not repeated.

First Embodiment

The following describes a configuration of a smartphone 100 according to a first embodiment of the present disclosure with reference to FIG. 1. FIG. 1 illustrates the configuration of the smartphone 100 according to the first embodiment of the present disclosure. As illustrated in FIG. 1, the smartphone 100 includes a touch panel 1 and a controller 2. The smartphone 100 is an example of a "display control device". The touch panel 1 displays an image and receives a user operation. The controller 2 controls operation of the touch panel 1.

The touch panel 1 includes a display 11 and a touch sensor 12. The display 11 includes for example a liquid crystal display (LCD) and displays various images. The touch sensor 12 receives a user operation. The touch sensor 12 is disposed on a display surface of the display 11, for example. The touch panel 1 has a rectangular shape.

The controller 2 includes a processor 21 and storage 22. The processor 21 includes for example a central processing unit (CPU). The storage 22 includes memory such as semiconductor memory and may include a hard disk drive (HDD). The storage 22 stores therein control programs. The control programs each are an example of a "display control program".

Figure 2:
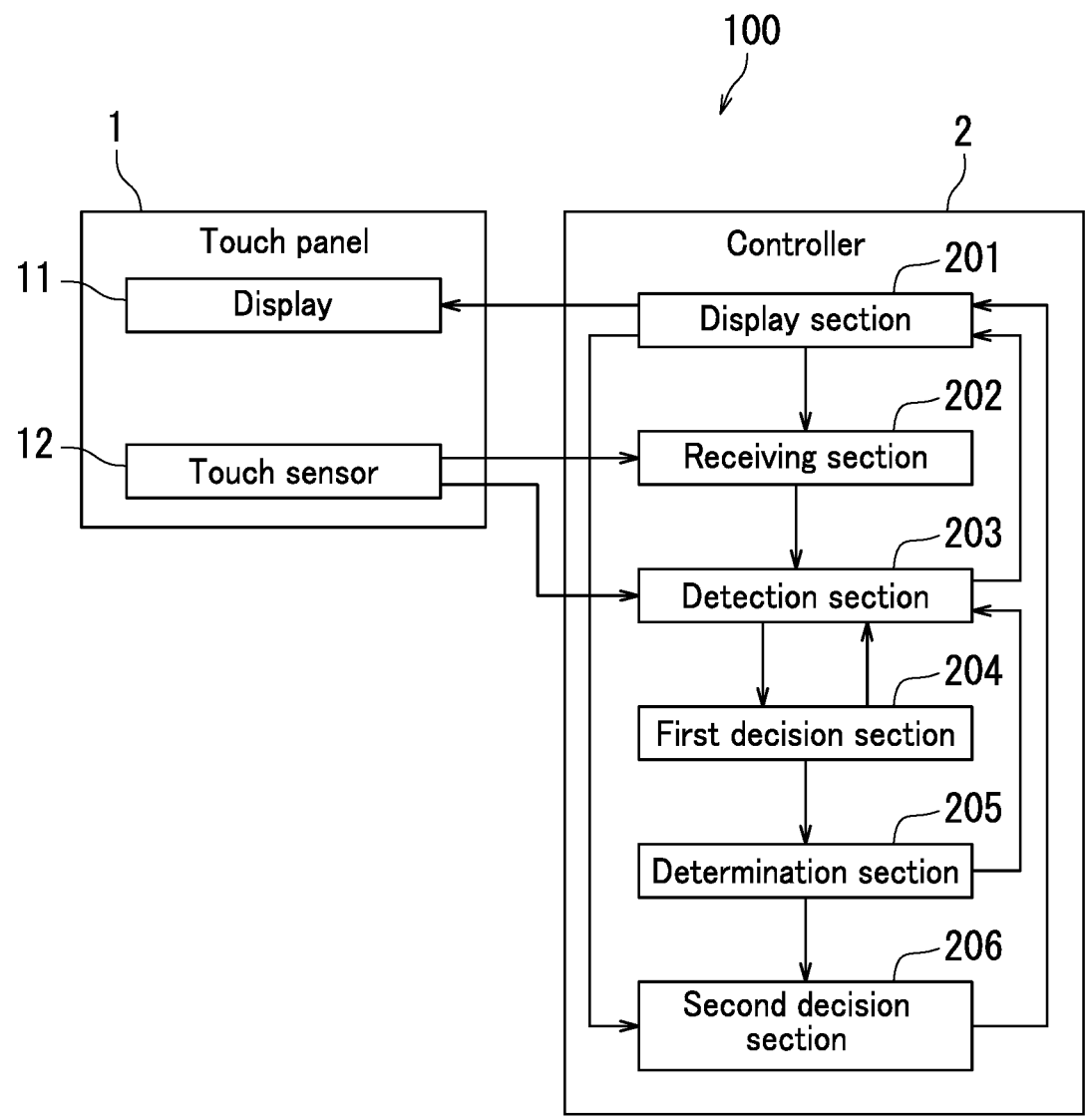
FIG. 2 is a diagram illustrating a configuration of a controller according to the first embodiment of the present disclosure.

The following describes a configuration of the controller 2 according to the first embodiment of the present disclosure with reference to FIGS. 1 to 3B. FIG. 2 illustrates the configuration of the controller 2 according to the first embodiment of the present disclosure. The controller 2 includes a display section 201, a receiving section 202, a detection section 203, a first decision section 204, a determination section 205, and a second decision section 206. Specifically, the processor 21 of the controller 2 functions as the display section 201, the receiving section 202, the detection section 203, the first decision section 204, the determination section 205, and the second decision section 206 through execution of the control programs. The display section 201 displays a character input screen 600 on the touch panel 1.

The following describes the character input screen 600 with reference to FIGS. 3A and 3B. FIG. 3A is a screen diagram illustrating an example of the character input screen 600. FIG. 3B is a screen diagram illustrating an example of a slide operation TS performed on the character input screen 600.

As illustrated in FIG. 3A, the character input screen 600 is displayed on the touch panel 1. The character input screen 600 includes a first object group GB1. The first object group GB1 is displayed in a first region AR1 of the touch panel 1. The first region AR1 is located at an end of the touch panel 1 in a direction D1 (i.e., an end close to a user's body operating the smartphone 100) and extends in a direction D2. The first region AR1 is a rectangular region. The direction D1 is parallel to a peripheral side (e.g., a long side) of the touch panel 1. The direction D2 is parallel to another peripheral side (e.g., a short side) of the touch panel 1.

The first object group GB1 includes a first object BJ1, a second object BJ2, a third object BJ3, a fourth object BJ4, a fifth object BJ5, a sixth object BJ6, a seventh object BJ7, an eighth object BJ8, a ninth object BJ9, and a tenth object BJ10. The first through tenth objects BJ1 to BJ10 respectively correspond to "A" to "WA" columns in which romaji (roman letters) of the Nihon-shiki romanization system (or the Kunrei-shiki romanization system) is arranged according to the Japanese syllabary. In the Japanese syllabary, Japanese kana characters (hiragana or katakana) are arranged in a matrix of five rows according to vowels and ten columns according to consonants.

The "A" column includes roman letters corresponding to five kana characters pronounced with only vowels without consonants. The "KA" column includes roman letters corresponding to five kana characters pronounced with a consonant represented by "K". The "SA" column includes roman letters corresponding to five kana characters pronounced with a consonant represented by "S". The "TA" column includes roman letters corresponding to five kana characters pronounced with a consonant represented by "T". The "NA" column includes roman letters corresponding to five kana characters pronounced with a consonant represented by "N". The "HA" column includes roman letters corresponding to five kana characters pronounced with a consonant represented by "H". The "MA" column includes roman letters corresponding to five kana characters pronounced with a consonant represented by "M". The "YA" column includes roman letters corresponding to three kana characters pronounced with a consonant represented by "Y". The "RA" column includes roman letters corresponding to five kana characters pronounced with a consonant represented by "R". The "WA" column includes roman letters corresponding to a kana character pronounced with a consonant represented by "W" and roman letters corresponding to a kana character pronunciation of which is represented by "W" and "O". In the following description of embodiments of the present disclosure, the term "character" refers to roman letter(s) representing a Japanese kana character according to the Nihon-shiki romanization system (or the Kunrei-shiki romanization system).

As illustrated in FIG. 3B, a character string display area TX is also displayed on the character input screen 600. An input character string is displayed in the character string display area TX. A slide operation TS is performed as follows. First, the user touches a start point P11 with the forefinger of a hand H. The start point P11 is located on the fourth object BJ4. The user then moves the forefinger to an end point P12 while keeping the forefinger touching the touch panel 1. Then at the end point P12, the user removes the forefinger from the touch panel 1.

In the slide operation TS, the forefinger is moved in a movement direction parallel to the direction D1. A movement distance LT1 of the slide operation TS indicates a distance from the fourth object BJ4 to the end point P12. Specifically, the movement distance LT1 indicates a distance from an end of the fourth object BJ4 in the direction D1 to the end point P12. For ease of preparation of the drawing, the start point P11 is illustrated at the same position as the end of the fourth object BJ4 in the direction D1 in FIG. 3B.

In response to the slide operation TS, the display section 201 displays a character CA1 on the touch panel 1 as illustrated in FIG. 3B. The character CA1 is represented as "TO" in FIG. 3B.

The following specifically describes the configuration of the controller 2 with reference to FIGS. 2, 3A, and 3B.

The display section 201 displays at least one object BJ on the touch panel 1. Specifically, the display section 201 displays a plurality of objects BJ (e.g., 10 objects) arranged in parallel to a peripheral side (e.g., a bottom line) of the touch panel 1.

The receiving section 202 receives a slide operation TS performed on one object BJ of the objects BJ.

When the slide operation TS is received by the receiving section 202, the display section 201 determines, based on the slide operation TS, a character CA corresponding to the one object BJ on which the slide operation TS is performed, and displays the character CA on the touch panel 1. Note that the character CA includes at least roman letter(s) representing a Japanese kana character (i.e., a character included in the Japanese syllabary).

The display section 201 also displays a character string display area TX on the touch panel 1. The input character CA is displayed in the character string display area TX.

The detection section 203 detects a movement distance LM from the one object BJ to an end point PE of the slide operation TS. The detection section 203 corresponds to a "first detection section", a "second detection section", a "third detection section", a "fourth detection section", and a "fifth detection section".

The first decision section 204 decides whether or not an operation duration PD of the slide operation TS is lasting. The operation duration PD is a period from the start of the slide operation TS to the end thereof.

The determination section 205 determines an object BJ from the plurality of objects BJ (e.g., 10 objects) according to a location of the end point PE. The determination section 205 corresponds to a "first determination section" and a "second determination section".

The second decision section 206 decides whether or not a number NC of characters CA displayed in the character string display area TX is equal to or larger than a specific number NCS.

As described above with reference to FIGS. 1 to 3B, in the first embodiment of the present disclosure, a character CA corresponding to an object BJ is determined based on a slide operation TS. Therefore, the character CA can be input for example by determining a column among the "A" to "WA" columns according to the object BJ and determining a row among "A" to "O" rows according to the movement distance LM. In this configuration, operability is improved and the character CA can be input through an operation within a small space. Note that the "A" to "WA" columns include the "A" column, the "KA" column, the "SA" column, the "TA" column, the "NA" column, the "HA" column, the "MA" column, the "YA" column, the "RA" column, and the "WA" column. The "A" to "O" rows include an "A" row, an "I" row, an "U" row, an "E" row, and an "O" row.

Specifically, the "A" row includes roman letters corresponding to 10 kana characters pronounced with a vowel represented by "A". The "I" row includes roman letters corresponding to 8 kana characters pronounced with a vowel represented by "I".

The "U" row includes roman letters corresponding to 9 kana characters pronounced with a vowel represented by "U". The "E" row includes roman letters corresponding to 8 kana characters pronounced with a vowel represented by "E". The "O" row includes roman letters corresponding to 10 kana characters pronounced with a vowel represented by "O".

The following describes with reference to FIGS. 2 and 3B processing performed by the controller 2 when the slide operation TS illustrated in FIG. 3B is performed. The controller 2 displays the character CA1 on the touch panel 1 through execution of the following processing.

The detection section 203 detects the movement distance LT1. The display section 201 determines the character CA1 corresponding to the fourth object BJ4 based on the slide operation TS, and displays the character CA1 on the touch panel 1. Specifically, the display section 201 determines a character corresponding to one of the "A" to "O" rows as the character CA1 according to the movement distance LT1. For example, the fourth object BJ4 corresponds to the "TA" column. Accordingly, the display section 201 determines one of the following characters "TA", "TI", "TU", "TE", and "TO" as the character CA1 according to the movement distance LT1.

More specifically, the display section 201 determines whether or not the movement distance LT1 satisfies expression (1) below. When determining that the movement distance LT1 satisfies expression (1), the display section 201 displays a character included in the "A" row (e.g., "TA").

$$0 \leq LT1 < LA \tag{1}$$

A first distance LA in above expression (1) is greater than 0.

The display section 201 determines whether or not the movement distance LT1 satisfies expression (2) below. When determining that the movement distance LT1 satisfies expression (2), the display section 201 displays a character included in the "I" row (e.g., "TI").

$$LA \leq LT1 < LB \tag{2}$$

A second distance LB in above expression (2) is greater than the first distance LA.

The display section 201 determines whether or not the movement distance LT1 satisfies expression (3) below. When determining that the movement distance LT1 satisfies expression (3), the display section 201 displays a character included in the "U" row (e.g., "TU").

$$LB \leq LT1 < LC \tag{3}$$

A third distance LC in above expression (3) is greater than the second distance LB.

The display section 201 determines whether or not the movement distance LT1 satisfies expression (4) below. When determining that the movement distance LT1 satisfies expression (4), the display section 201 displays a character included in the "E" row (e.g., "TE").

$$LC \leq LT1 < LD \tag{4}$$

A fourth distance LD in above expression (4) is greater than the third distance LC.

The display section 201 determines whether or not the movement distance LT1 satisfies expression (5) below. When determining that the movement distance LT1 satisfies expression (5), the display section 201 displays a character included in the "O" row (e.g., "TO").

$$LD \leq LT1 < LE \tag{5}$$

A fifth distance LE in above expression (5) is greater than the fourth distance LD.

Suppose for example that the movement distance LT1 satisfies expression (5). Accordingly, the display section 201 determines "TO" as the character CA1 and displays "TO" as illustrated in FIG. 3B.

Note that the first through fifth distances LA to LE satisfy expression (6) below.

$$LE-LD=LD-LC=LC-LB=LB-LA \tag{6}$$

That is, a difference between the second distance LB and the first distance LA, a difference between the third distance LC and the second distance LB, a difference between the fourth distance LD and the third distance LC, and a difference between the fifth distance LE and the fourth distance LD are equal to one another.

As described above with reference to FIGS. 2, 3A, and 3B, in the first embodiment of the present disclosure, the display section 201 determines a character CA corresponding to the object BJ according to the movement distance LT1. For example, the display section 201 determines a character CA corresponding to one of the "A" to "O" rows according to the movement distance LT. In this configuration, operability is further improved and the character CA can be input through an operation within a small space.

The first through tenth objects BJ1 to BJ10 each represent one of the "A" to "WA" columns, and a character CA corresponding to one of the "A" to "O" rows is determined according to the movement distance LT1. In this configuration, operability is further improved and the character CA can be selected from among 46 characters included in the Japanese syllabary through an operation within a small space.

Further, the first through tenth objects BJ1 to BJ10 are arranged in the direction D2. The first through tenth objects BJ1 to BJ10 represent the "A" to "WA" columns, respectively. Therefore, in a configuration in which there is a space for displaying the 10 objects BJ (first through tenth objects BJ1 to BJ10), a character CA can be selected from among the 46 characters included in the Japanese syllabary. In this configuration, operability is further improved and the character CA can be selected from among the 46 characters included in the Japanese syllabary through an operation within a small space.

Although the first object group GB1 includes the first through tenth objects BJ1 to BJ10, the present disclosure is not limited to this configuration. It is only required that the first object group GB1 includes at least one object BJ among the first through tenth objects BJ1 to BJ10. For example, the first object group GB1 may include only one object BJ or two objects BJ. In a configuration in which the number of objects BJ included in the first object group GB1 is large, the number of selectable characters increases. In a configuration in which the number of objects BJ included in the first object group GB1 is small, a user operation becomes easier.

Preferably, the first object group GB1 includes a plurality of objects BJ among the first through tenth objects BJ1 to BJ10. In a configuration in which the first object group GB1 includes a plurality of objects BJ among the first through tenth objects BJ1 to BJ10, a character CA can be selected from groups of characters included in respective columns corresponding to the objects BJ. More preferably, the first object group GB1 includes the first through tenth objects BJ1 to BJ10. In a configuration in which the first object group GB1 includes the first through tenth objects BJ1 to BJ10, a character CA can be selected from among the 46 characters included in the Japanese syllabary.

The following further describes processing performed by the controller 2 with reference to FIGS. 2 to 4A. FIG. 4A is a screen diagram illustrating another example of a slide operation TS performed on the character input screen 600.

The slide operation TS illustrated in FIG. 4A is performed along a curved path, whereas the slide operation TS illustrated in FIG. 3B is performed along a straight path. As illustrated in FIG. 4A, a touch point of the slide operation TS moves from a start point P21 to an end point P23 via a curve point P22. The term touch point refers to a point on the touch panel 1 touched by the forefinger of the user's hand H.

Specifically, the slide operation TS is performed as follows. First, the user touches the start point P21 located on the third object BJ3 with the forefinger of the hand H. The user then moves the forefinger in the direction D1 to the curve point P22 while keeping the forefinger touching the touch panel 1. Further, the user moves the forefinger in the direction D2 to the end point P23 while keeping the forefinger touching the touch panel 1. Then at the end point P23, the user removes the forefinger from the touch panel 1.

In response to the slide operation TS illustrated in FIG. 4A, the controller 2 performs the following processing. The detection section 203 detects an end point QE of the slide operation TS. The end point QE indicates a location of the end point PE. For example, the end point QE indicates a location of the end point P23. The determination section 205 determines an object BJE from among the 10 objects (first through tenth objects BJ1 to BJ10) according to the end point QE.

Specifically, the determination section 205 determines from among the 10 objects BJ an object BJE located in a direction opposite to the direction D1 as seen from the end point QE. In a situation in which the end point QE indicates a location of the end point P23 for example, the determination section 205 determines the fourth object BJ4 as the object BJE.

The detection section 203 also detects a distance LT2 from the object BJE to the end point QE. The distance LT2 indicates a distance between the end point QE and an end of the object BJE close to the end point QE. The end of the object BJE close to the end point QE is located on an edge of the first region AR1 close to the end point QE.

The display section 201 determines a character CA2 corresponding to the object BJE according to the distance LT2. Specifically, the display section 201 determines a character CA2 corresponding to one of the "A" to "O" rows according to the distance LT2. For example, the fourth object BJ4 corresponds to the "TA" column. Accordingly, the display section 201 determines one of the following characters "TA", "TI", "TU", "TE", and "TO" as the character CA2 according to the distance LT2.

More specifically, the display section 201 determines whether or not the distance LT2 satisfies expression (7) below. When determining that the distance LT2 satisfies expression (7), the display section 201 displays a character included in the "A" row (e.g., "TA").

$$0 \leq LT2 < LA \quad (7)$$

The display section 201 determines whether or not the distance LT2 satisfies expression (8) below. When determining that the distance LT2 satisfies expression (8), the display section 201 displays a character included in the "I" row (e.g., "TI").

$$LA \leq LT2 < LB \quad (8)$$

The display section 201 determines whether or not the distance LT2 satisfies expression (9) below. When determining that the distance LT2 satisfies expression (9), the display section 201 displays a character included in the "U" row (e.g., "TU").

$$LB \leq LT2 < LC \quad (9)$$

The display section 201 determines whether or not the distance LT2 satisfies expression (10) below. When determining that the distance LT2 satisfies expression (10), the display section 201 displays a character included in the "E" row (e.g., "TE").

$$LC \leq LT2 < LD \quad (10)$$

The display section 201 determines whether or not the distance LT2 satisfies expression (11) below. When determining that the distance LT2 satisfies expression (11), the display section 201 displays a character included in the "O" row (e.g., "TO").

$$LD \leq LT2 < LE \quad (11)$$

Suppose for example that the distance LT2 satisfies expression (11). Accordingly, the display section 201 determines "TO" as the character CA2 and displays "TO" as illustrated in FIG. 4A.

The display section 201 displays the character CA2 at a specific position. The specific position is located further away from the 10 objects BJ than the end point QE (i.e., located in the direction D1 as seen from the end point QE). That is, the specific position is located further away from the first region AR1 than the end point QE. For example, the display section 201 displays the character CA2 so as to be located in the direction D1 as seen from the end point QE.

As described above with reference to FIGS. 2 to 4A, in the first embodiment of the present disclosure, an object BJE (e.g., an object BJE corresponding to one of the "A" to "WA" columns) is determined from among the 10 objects BJ according to the end point QE. Further, a character CA2 corresponding to the object BJE (e.g., a character corresponding to one of the "A" to "O" rows) is determined according to the distance LT2. Therefore, the character CA2 can be determined from among the 46 characters included in the Japanese syllabary irrespective of the direction and the path of the slide operation TS. The above results in further improvement in operability.

Further, even when the start point P21 is located on the third object BJ3 that represents the "SA" column, the character "TO" corresponding to the fourth object BJ4 that represents the "TA" column can be displayed. That is, even when the user touches an unintended point as the start point P21, a character that the user intends to display can be displayed. Therefore, even when the user touches an unintended point as the start point P21, the user need not perform the slide operation TS again. The above results in further improvement in operability.

Also, the display section 201 displays the character CA2 at a specific position. The specific position is located further away from the first object group GB1 than the end point QE. Therefore, in a configuration in which the first object group GB1 is located at an end of the character input screen 600 in the direction D1, which end is close to the user's body, the character CA2 is displayed so as to be located in the direction D1 as seen from the end point QE through the slide operation TS in the direction D1. The above results in improvement in visibility of the character CA2 displayed upon completion of the slide operation TS.

Although the slide operation TS illustrated in FIG. 4A is performed along a path curved at a point (curve point P22), the present disclosure is not limited to this configuration. The slide operation TS may be performed along a path including any number of curves. For example, the slide operation TS may be performed along a path including two or more curves.

The following further describes processing performed by the controller 2 with reference to FIGS. 2 to 4B. FIG. 4B is a screen diagram illustrating an example of a relationship between a touch point PT and a character CA3 to be determined. The touch point PT indicates a point on the touch panel 1 touched by the user in the slide operation TS.

As illustrated in FIG. 4B, the first object group GB1 is displayed in the first region AR1 of the character input screen 600 displayed on the touch panel 1. The first object group GB1 includes the first through tenth objects BJ1 to BJ10.

Throughout the operation duration PD of the slide operation TS, the controller 2 determines the character CA3 according to the touch point PT of the slide operation TS and displays the character CA3 on the touch panel 1. The following specifically describes the processing performed by the controller 2.

The first decision section 204 decides whether or not the operation duration PD of the slide operation TS is lasting. The detection section 203 detects the touch point PT of the slide operation TS.

The determination section 205 determines an object BJT from among the 10 objects BJ according to the touch point PT. Specifically, the character input screen 600 is sectioned into 10 column regions (column regions CM1, CM2, CM3, CM4, CM5, CM6, CM7, CM8, CM9, and CM10) as illustrated in FIG. 4B. The column regions CM1 to CM10 each have a rectangular shape.

The column regions CM1 to CM10 correspond to the first through tenth objects BJ1 to BJ10, respectively. The column regions CM1 to CM10 are respective regions extended from where the first through tenth objects BJ1 to BJ10 are located. The determination section 205 determines an object BJT corresponding to the touch point PT according to in which of the column regions CM1 to CM10 the touch point PT is included. For example, in a situation in which the touch point PT is included in the column region CM2, the determination section 205 determines the second object BJ2 (corresponding to the "KA" column) as the object BJT.

The detection section 203 detects a distance LT3 from the object BJT to the touch point PT. The distance LT3 indicates a distance between the touch point PT and an end of the object BJT close to the touch point PT. The end of the object BJT close to the touch point PT is located on an edge of the first region AR1 close to the touch point PT.

The display section 201 displays a character CA3 corresponding to the object BJE according to the distance LT3. Specifically, the display section 201 determines a character corresponding to one of the "A" to "O" rows as the character CA3 according to the distance LT3.

More specifically, the character input screen 600 is sectioned into five row regions (row regions LN1, LN2, LN3, LN4, and LN5) as illustrated in FIG. 4B. The row regions LN1 to LN5 each extend in the direction D2. The row regions LN1 to LN5 each have a rectangular shape. The row regions LN1 to LN5 are arranged in the stated order in the direction D1 away from the first object group GB1.

An edge of the row region LN2 close to the first object group GB1 is spaced from an edge of the first object group GB1 (first region AR1) close to the row region LN2 by the first distance LA. An edge of the row region LN3 close to the first object group GB1 is spaced from an edge of the first object group GB1 (first region AR1) close to the row region LN3 by the second distance LB. An edge of the row region LN4 close to the first object group GB1 is spaced from an edge of the first object group GB1 (first region AR1) close to the row region LN4 by the third distance LC. An edge of the row region LN5 close to the first object group GB1 is spaced from an edge of the first object group GB1 (first region AR1) close to the row region LN5 by the fourth distance LD. An edge of the row region LN5 far from the first object group GB1 is spaced from the edge of the first object group GB1 (first region AR1) close to the row region LN5 by the fifth distance LE.

The display section 201 determines the character CA3 corresponding to one of the "A" to "O" rows according to in which of the row regions LN1 to LN5 the touch point PT is included. Specifically, in a situation in which the touch point PT is included in the row region LN1, the display section 201 determines a character corresponding to the "A" row as the character CA3. In a situation in which the touch point PT is included in the row region LN2, the display section 201 determines a character corresponding to the "I" row as the character CA3. In a situation in which the touch point PT is included in the row region LN3, the display section 201 determines a character corresponding to the "U" row as the character CA3. In a situation in which the touch point PT is included in the row region LN4, the display section 201 determines a character corresponding to the "E" row as the character CA3. In a situation in which the touch point PT is included in the row region LN5, the display section 201 determines a character corresponding to the "O" row as the character CA3.

For example, in a situation in which the touch point PT is included in the row region LN4, the determination section 205 determines a character corresponding to the "E" row as the character CA3. Also, the determination section 205 determines the second object BJ2 (corresponding to the "KA" column) as the object BJT. Accordingly, the determination section 205 determines "KE" as the character CA3.

The display section 201 displays the character CA3 at a specific position. The specific position is located further away from the first object group GB1 (first region AR1) than the touch point PT. For example, the display section 201 displays the character CA3 so as to be located in the direction D1 as seen from the touch point PT.

As described above with reference to FIGS. 2 to 4B, in the first embodiment of the present disclosure, throughout the operation duration PD of the slide operation TS, an object BJE (e.g., an object BJE corresponding to one of the "A" to "WA" columns) is determined from among the 10 objects BJ (first through tenth objects BJ1 to BJ10) according to the touch point PT. Further, a character CA3 corresponding to the object BJE (e.g., a character CA3 corresponding to one of the "A" to "O" rows) is determined according to the distance LT3. Therefore, the character CA3 included in the 46 characters of the Japanese syllabary can be displayed throughout the operation duration PD of the slide operation TS. Since the character CA3 is displayed during the slide operation TS, it can be ensured that the character CA3 that the user intends to display is determined by ending the slide operation TS when the character CA3 is displayed. Thus, it can be ensured that the character CA3 that the user intends to display is determined from among the 46 characters included in the Japanese syllabary.

Further, the display section 201 displays the character CA3 at a specific position. The specific position is located further away from the first object group GB1 than the touch point PT. Therefore, in a configuration in which the first object group GB1 is located at the end of the character input screen 600 in the direction D1, which end is close to the user's body, the character CA3 is displayed so as to be located in the direction D1 as seen from the touch point PT through the slide operation TS in the direction D1. The above results in improvement in visibility of the character CA3 displayed during the slide operation TS.

Note that the present disclosure is not limited to a configuration in which the display section 201 displays the first through tenth objects BJ1 to BJ10 in the first region AR1 as illustrated in FIG. 4B. It is only required that the display section 201 displays at least one object BJ among the first through tenth objects BJ1 to BJ10 in the first region AR1. Preferably, the display section 201 displays a plurality of objects BJ among the first through tenth objects BJ1 to BJ10. More preferably, the display section 201 displays the first through tenth objects BJ1 to BJ10 in the first region AR1.

Figure 5A:
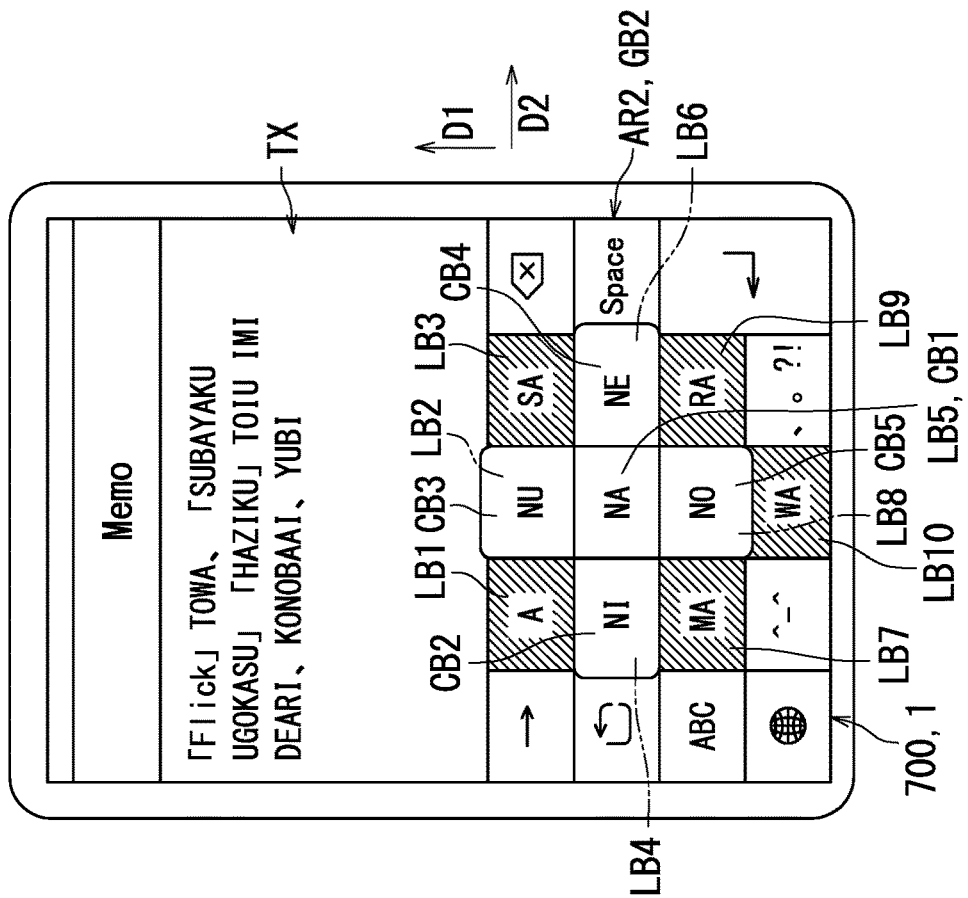
FIG. 5A is a screen diagram illustrating an example of another character input screen.
Figure 5B:
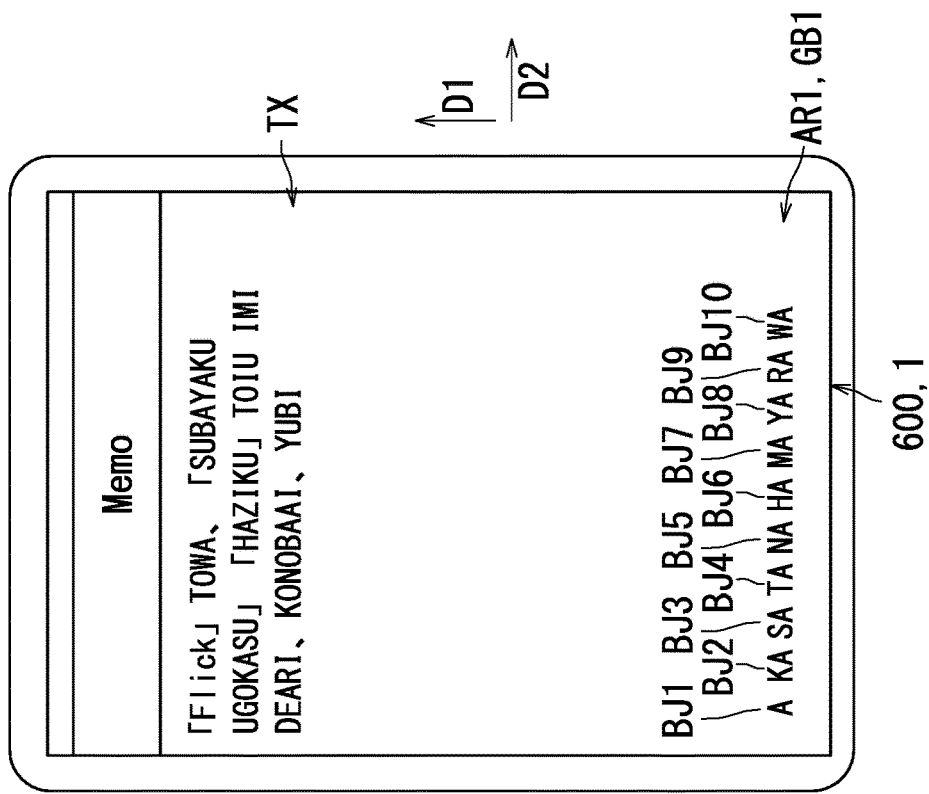
FIG. 5B is a screen diagram illustrating an example of a character input screen according to the present disclosure.

The following further describes processing performed by the controller 2 with reference to FIGS. 2 to 5B. FIG. 5A is a screen diagram illustrating an example of another character input screen 700. FIG. 5B is a screen diagram illustrating an example of the character input screen 600 according to the present disclosure. The first object group GB1 is displayed on the character input screen 600 illustrated in FIGS. 3A, 3B, 4A, and 4B, whereas a second object group GB2 is displayed on the character input screen 700 illustrated in FIG. 5A.

As illustrated in FIG. 5A, the second object group GB2 is displayed in a second region AR2 of the character input screen 700. Also, a character string display area TX is displayed on the character input screen 700 so as to be located in the direction D1 as seen from the second region AR2.

The second object group GB2 includes 10 objects LB (objects LB1, LB2, LB3, LB4, LB5, LB6, LB7, LB8, LB9, and LB10). The second region AR2 is located at an end of the character input screen 700 in the direction D1, which end is close to the user's body operating the smartphone 100. Note that the objects LB2, LB4, LB6, and LB8 are hidden by other objects (hereinafter referred to as four objects CB) in FIG. 5A.

The objects LB1 to LB0 each represent a corresponding one of the "A" to "WA" columns. In response to a touch for example on the object LB5 representing the "NA" column, the four objects CB (objects CB2, CB3, CB4, and CB5) are displayed as illustrated in FIG. 5A. The objects CB2, CB3, CB4, and CB5 are touched in order to display characters "NI", "NU", "NE", and "NO", respectively. An operation for inputting a character CA by determining the character CA using the second object group GB2 as described above may be hereinafter referred to as a character input operation PC2.

The second decision section 206 decides whether or not the number NC of characters CA displayed in the character string display area TX is equal to or larger than a specific number NCS. When the second decision section 206 decides that the number NC is equal to or larger than the specific number NCS, the controller 2 erases the second object group GB2 illustrated in FIG. 5A. The display section 201 then displays the first object group GB1 in the first region AR1 of the touch panel 1 as illustrated in FIG. 5B, and the receiving section 202 receives a slide operation TS.

As described above with reference to FIGS. 2 to 5B, in the first embodiment of the present disclosure, when it is decided that the number NC of characters CA displayed in the character string display area TX is equal to or larger than the specific number NCS, the first object group GB1 is displayed on the touch panel 1 and a slide operation TS is received. That is, when it is decided that the number NC of characters CA is equal to or larger than the specific number NCS (i.e., when an available blank space becomes small), a character CA can be selected through a slide operation TS on an object BJ included in the first object group GB1. The above results in further improvement in operability.

Although the first object group GB1 is displayed on the touch panel 1 when it is decided that the number NC of characters CA is equal to or larger than the specific number NCS in the above-described embodiment, it is only required that the first object group GB1 is displayed on the touch panel 1 when a specific condition is satisfied. The specific condition may be a condition that the character string display area TX has a specific size or larger.

Figure 6:
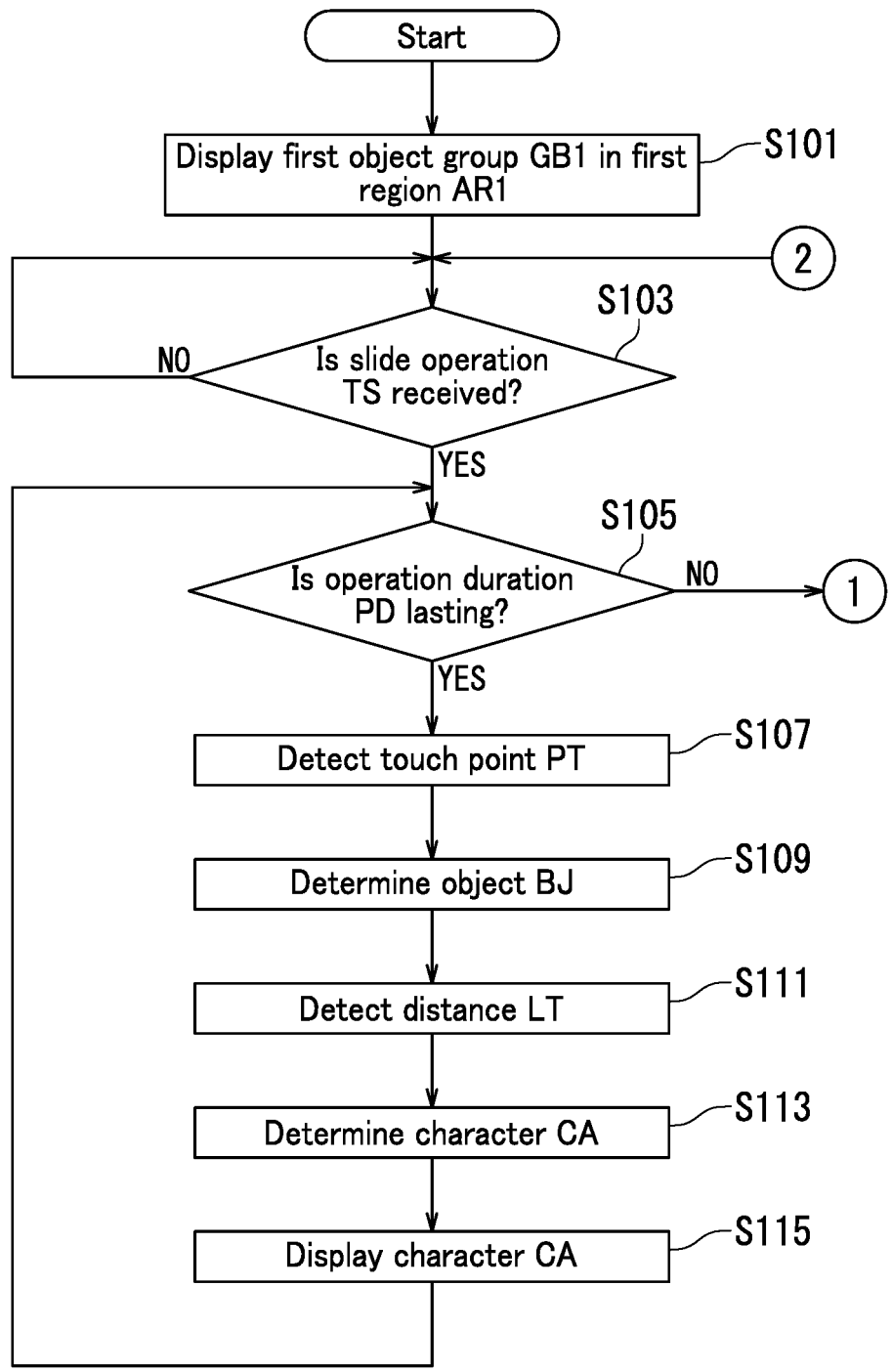
FIG. 6 is a flowchart depicting processing performed by the controller.
Figure 7:
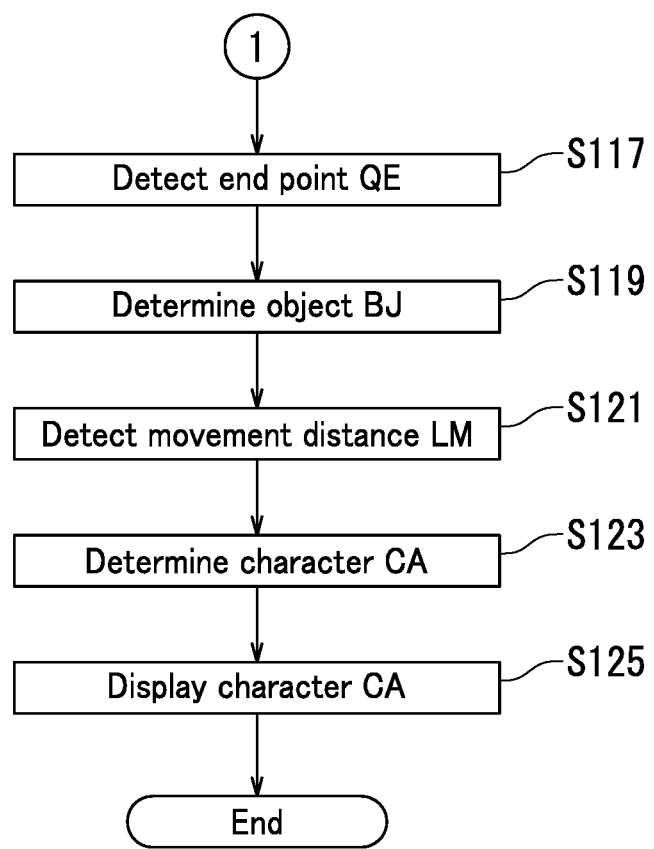
FIG. 7 is a flowchart depicting the processing performed by the controller.

The following describes processing performed by the controller 2 with reference to FIGS. 2 to 7. FIGS. 6 and 7 are each a flowchart depicting the processing 16 performed by the controller 2.

As depicted in FIG. 6, the display section 201 first displays the first object group GB1 in the first region AR1 of the touch panel 1 at Step S101. The first object group GB1 includes the first through tenth objects BJ1 to BJ10.

Next at Step S103, the receiving section 202 determines whether or not a slide operation TS on an object BJ is received.

When the receiving section 202 determines that no slide operation TS is received (NO at Step S103), the processing is suspended. When the receiving section 202 determines that the slide operation TS is received (YES at Step S103), the routine proceeds to Step S105.

At Step S105, the first decision section 204 decides whether or not an operation duration PD of the slide operation TS is lasting.

When the first decision section 204 decides that the operation duration PD of the slide operation TS is ended (NO at Step S105), the routine proceeds to Step S117 in FIG. 7. When the first decision section 204 decides that the operation duration PD of the slide operation TS is lasting (YES at Step S105), the routine proceeds to Step S107.

At Step S107, the detection section 203 detects a touch point PT.

At Step S109, the determination section 205 determines an object BJ corresponding to the touch point PT.

At Step S111, the detection section 203 detects a distance LT.

At Step S113, the display section 201 determines a character CA based on the distance LT.

At Step S115, the display section 201 displays the character CA, and the routine then returns to Step S105.

When negative determination is made at Step S105, the detection section 203 detects an end point QE at Step S117 as depicted in FIG. 7.

At Step S119, the determination section 205 determines an object BJ corresponding to the end point QE.

At Step S121, the detection section 203 detects a movement distance LM.

At Step S123, the display section 201 determines a character CA based on the movement distance LM.

At Step S125, the display section 201 displays the character CA, and the processing ends then.

Step S101 corresponds to an example of "displaying at least one object". Step S103 corresponds to an example of "receiving". Steps S107 to S115 and Steps S117 to S125 are examples of "displaying a character".

As described above with reference to FIGS. 2 to 7, in the first embodiment of the present disclosure, a character CA corresponding to an object BJ is determined based on a slide operation TS on the object BJ. Therefore, operability is improved and the character CA can be input through an operation within a small space.

Figure 8:
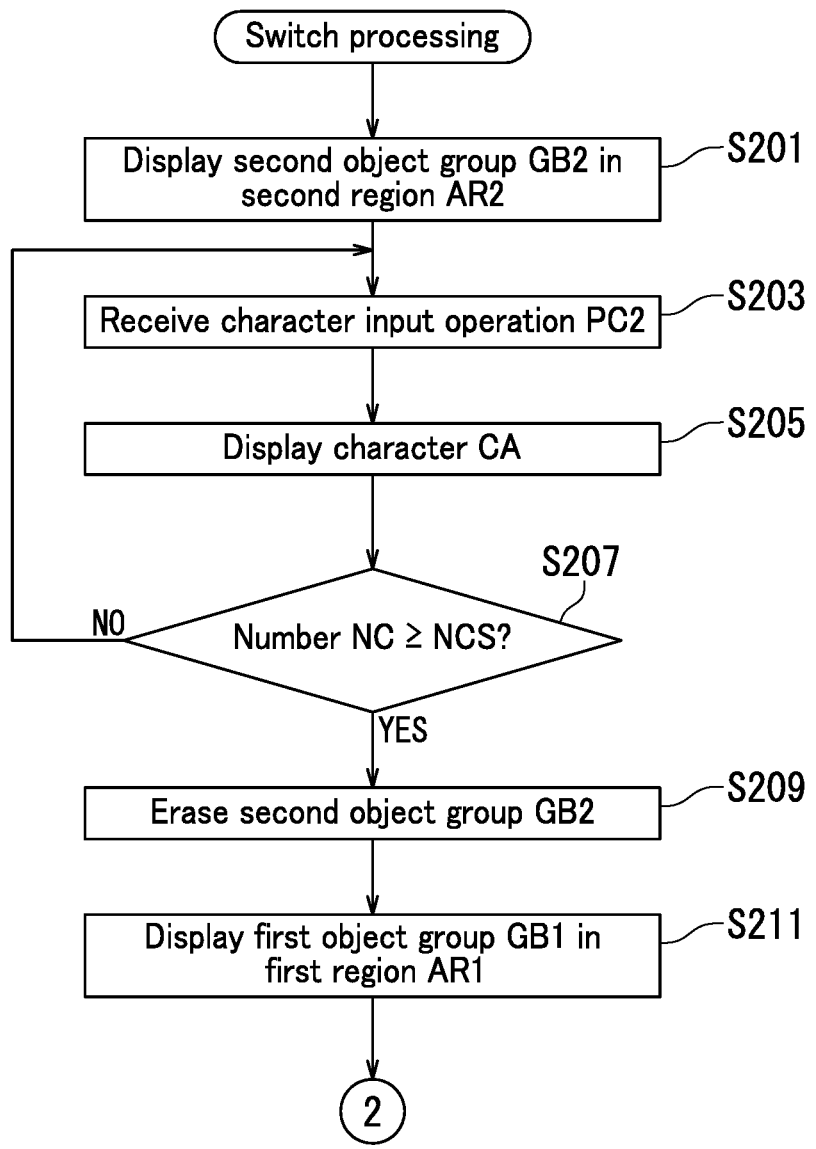
FIG. 8 is a flowchart depicting switch processing performed by the controller.

The following describes switch processing performed by the controller 2 with reference to FIGS. 2 to 8. FIG. 8 is a flowchart depicting the switch processing performed by the controller 2.

As depicted in FIG. 8, the controller 2 first displays the second object group GB2 in the second region AR2 at Step S201.

Next at Step S203, the controller 2 receives a character input operation PC2.

At Step S205, the controller 2 displays a character CA selected through the character input operation PC2.

At Step S207, the second decision section 206 decides whether or not the number NC of characters CA is equal to or larger than a specific number NCS.

When the second decision section 206 decides that the number NC of characters CA is not equal to or larger than the specific number NCS (NO at Step S207), the routine returns to Step S203. When the second decision section 206 decides that the number NC of characters CA is equal to or larger than the specific number NCS (YES at Step S207), the routine proceeds to Step S209.

At Step S209, the controller 2 erases the second object group GB2.

Next at Step S211, the display section 201 displays the first object group GB1 in the first region AR1, and the routine then returns to Step S103 in FIG. 6.

As described above with reference to FIGS. 2 to 8, in the first embodiment of the present disclosure, when it is decided that the number NC of characters CA is equal to or larger than the specific number NCS, the first object group GB1 is displayed on the touch panel 1 and a slide operation TS is received. Therefore, operability is further improved.

Although the term "character" refers to roman letter(s) representing a Japanese kana character in the first embodiment of the present disclosure, which should not be taken to limit the present disclosure. The term "character" may refer to a character string corresponding to a syllable in English. In this case, a "column" corresponds to English words having the same consonant in the first syllables thereof. For example, a "SH" column includes SHE, SHAT, SHEA, SHIP, SHOP, SHOW, SHADE, and SHALL. These words are included in the "SH" column. Further, a "row" corresponds to English words having the same vowel in the first syllables thereof. For example, an "I" row includes DIP, HIP, PIP, TIP, and SHIP. These words are included in the "I" row. Note that the order of vowels is set in advance.

That is, a plurality of objects included in the first object group GB1 each represent one of a plurality of columns. The columns each correspond to a group of words having the same consonant in the first syllables thereof.

Second Embodiment

Figure 9:
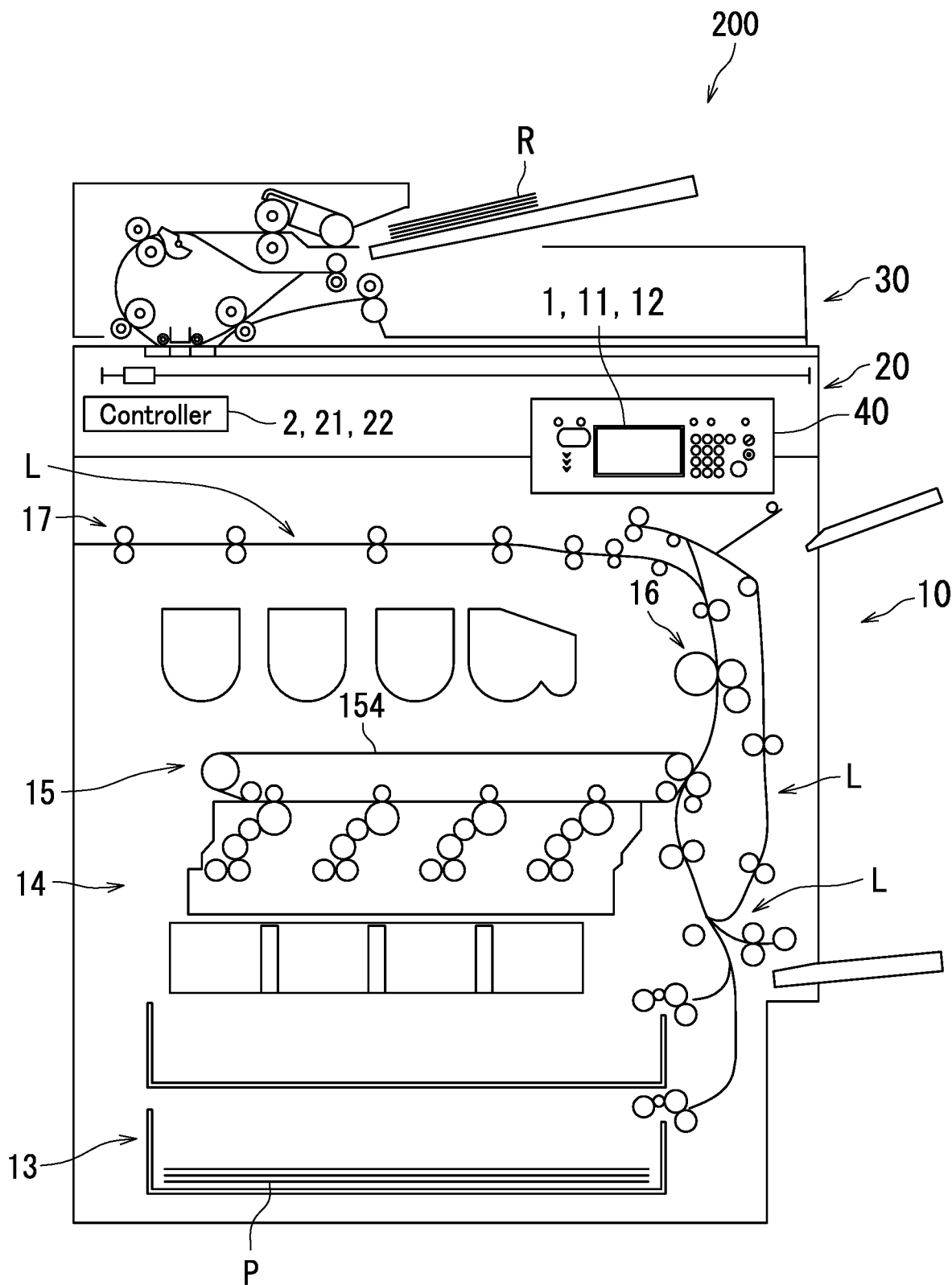
FIG. 9 is a diagram illustrating a configuration of an image forming apparatus according to a second embodiment of the present disclosure.

The following describes an image forming apparatus 200 according to a second embodiment with reference to FIGS. 1 to 9. FIG. 9 is a diagram illustrating a configuration of the image forming apparatus 200 according to the second embodiment of the present disclosure. The image forming apparatus 200 is a multifunction peripheral. The "display control device" according to the first embodiment is the smartphone 100, whereas a "display control device" according to the second embodiment is a part of the image forming apparatus 200.

As illustrated in FIG. 9, the image forming apparatus 200 includes an image forming unit 10, a document reading unit 20, a document conveyance unit 30, an operation panel 40, and a controller 2.

The image forming unit 10 forms an image on a sheet P of paper, which is an example of a recording medium. The document reading unit 20 reads an image formed on a document R. The document conveyance unit 30 conveys the document R to the document reading unit 20. The operation panel 40 includes a touch panel 1 to receive a user operation. The controller 2 controls operation of the image forming apparatus 200.

The image forming unit 10 includes a feeding section 13, a conveyance section L, an image forming section 14, a fixing section 16, and an ejection section 17. The image forming section 14 includes a transfer section 15.

The feeding section 13 feeds a sheet P to the conveyance section L. The conveyance section L conveys the sheet P to the ejection section 17 via the transfer section 15 and the fixing section 16. The image forming section 14 forms an image on the sheet P.

The transfer section 15 includes an intermediate transfer belt 154. The image forming section 14 transfers toner images in cyan, magenta, yellow, and black colors on the intermediate transfer belt 154. The toner images in the respective colors are superimposed on the intermediate transfer belt 154 to form an image on the intermediate transfer belt 154. The transfer section 15 transfers the image formed on the intermediate transfer belt 154 onto the sheet P. Through the above, an image is formed on the sheet P.

The fixing section 16 fixes the image formed on the sheet P to the sheet P by applying heat and pressure to the sheet P. The ejection section 17 ejects the sheet P out of the image forming apparatus 200.

The touch panel 1 has a configuration substantially the same as that of the touch panel 1 of the smartphone 100 according to the first embodiment of the present disclosure. Also, the controller 2 has a configuration substantially the same as that of the controller 2 of the smartphone 100. Accordingly, effects similar to those achieved by the smartphone 100 can be achieved by the image forming apparatus 200. The image forming apparatus 200 is an example of the "display control device".

Through the above, the embodiments of the present disclosure have been described with reference to the drawings. However, the present disclosure is not limited to the above embodiments and can be practiced in various manners within a scope not departing from the gist of the present disclosure (for example as described below in (1) to (3)). The drawings schematically illustrate elements of configuration in order to facilitate understanding. Properties of the elements of configuration such as thickness and length and the number thereof illustrated in the drawings may differ from actual ones in order to facilitate preparation of the drawings. Shapes, dimensions, and the like of elements of configuration described in the above embodiments are merely examples and should not be taken to limit the present disclosure. Various alterations may be made within a scope not substantially departing from the configuration of the present disclosure.

(1) As described with reference to FIG. 1, the "display control device" is the smartphone 100 in the first embodiment of the present disclosure, which however should not be taken to limit the present disclosure. It is only required that the "display control device" includes the touch panel 1 and the controller 2. The "display control device" may be for example a tablet terminal device. Alternatively, the "display control device" may be for example any of various home electric appliances such as a CD player and a DVD player. Alternatively, the "display control device" may be for example a car navigation system.

(2) As described with reference to FIGS. 1 to 3B, the display section 201 displays the first object group GB1 in the first embodiment of the present disclosure, which however should not be taken to limit the present disclosure. It is only required that the display section 201 displays at least one object BJ on the touch panel 1. In a configuration in which the number of objects BJ displayed on the touch panel 1 is large, types of selectable characters CA increases.

(3) As described with reference to FIGS. 1 to 3B, the display section 201 displays the first object group GB1 in the first region AR1 in the first embodiment of the present disclosure, which however should not be taken to limit the present disclosure. The first object group GB1 may be displayed anywhere on the touch panel 1. The first object group GB1 may be displayed for example along a side of the touch panel 1 extending in the direction D1. Alternatively, the first object group GB1 may be displayed for example along a side of the touch panel 1 extending in the direction D2.

What is claimed is:
1. A display control device comprising:
a touch panel;
a display section configured to display a plurality of objects on the touch panel;
a receiving section configured to receive a slide operation on any one object of the objects;
a first detection section;
a second detection section configured to detect an end point of the slide operation; and
a first determination section, wherein
each of the objects corresponds to a plurality of characters,
the first determination section determines one object from the objects according to the end point,
the first detection section detects a first distance in a first direction from the one object determined by the first determination section to the end point,
when the slide operation is received by the receiving section, the display section determines, according to the first distance, any one character of the characters corresponding to the one object determined by the first determination section and displays the character on the touch panel,
the touch panel has a rectangular shape,
the display section displays the objects arranged in a second direction parallel to one side among peripheral sides of the touch panel,
the first direction is orthogonal to the second direction,
the display section displays an object group on the touch panel,
in the object group, the objects are arranged in a grid,
when the slide operation performed on the object is received by the receiving section, the display section displays a character string display area which includes an input character on the touch panel,
the display control device further comprises a second decision section configured to decide whether or not the number of characters included in the character string display area is equal to or larger than a specific number,
when the second decision section decides that the number of characters is equal to or larger than the specific number, the display section erases the object group, and
after the object group has been erased, the display section displays the objects arranged in the second direction on the touch panel and the receiving section receives the slide operation.

2. The display control device according to claim 1, wherein
the one object represents any one of an A column, a KA column, a SA column, a TA column, a NA column, a HA column, a MA column, a YA column, a RA column, and a WA column of the Japanese syllabary, and
the display section determines as the character, a character corresponding to one of an A row, an I row, an U row, an E row, and an 0 row of the Japanese syllabary according to the first distance.

3. The display control device according to claim 1, wherein
the one object represents any one of a plurality of columns,
the columns each correspond to a group of words having the same consonant in first syllables thereof, and
the display section determines a word included in the group of the words according to the first distance.

4. The display control device according to claim 1, wherein
the objects each represent any one of an A column, a KA column, a SA column, a TA column, a NA column, a HA column, a MA column, a YA column, a RA column, and a WA column of the Japanese syllabary.

5. The display control device according to claim 4, further comprising:
a first decision section configured to decide whether or not an operation duration of the slide operation is lasting;
a third detection section configured to detect a touch point of the slide operation;
a second determination section configured to determine the one object from the objects according to the touch point; and
a fourth detection section configured to detect a second distance from the one object to the touch point, wherein the touch point is a point on the touch panel touched by a user in the slide operation, and the display section displays the character corresponding to the one object according to the second distance.

6. The display control device according to claim 1, wherein
the objects each represent any one of a plurality of columns, and
the columns each correspond to a group of words having the same consonant in first syllables thereof.

7. The display control device according to claim 1, wherein
the display section displays the character at a specific position, and
the specific position is located further away from the objects than the end point.

8. The display control device according to claim 1, wherein
the slide operation is performed along a straight path or a curved path.

9. A display control method executed by a display control device including a touch panel, the display control method comprising:
displaying, by the display control device, a plurality of objects on the touch panel, each of the objects corresponding to a plurality of characters;
receiving, by the display control device, a slide operation on any one object of the objects;
detecting an end point of the slide operation;
determining one object from the objects according to the end point;
detecting a first distance in a first direction from the determined one object to the end point;
upon reception of the slide operation, determining, by the display control device according to the first distance, any one character of the characters corresponding to the determined one object and displaying the character on the touch panel, wherein
the touch panel has a rectangular shape,
the objects are displayed arranged in a second direction parallel to one side among peripheral sides of the touch panel,
the first direction is orthogonal to the second direction,
the display control method further comprises:
displaying an object group on the touch panel;
arranging the objects in the object group in a grid;
displaying, when the slide operation performed on the object is received by the display control device, a character string display area which includes an input character on the touch panel;
deciding whether or not the number of characters included in the character string display area is equal to or larger than a specific number;
erasing the object group when the number of characters is decided to be equal to or larger than the specific number; and
displaying the objects arranged in the second direction on the touch panel and receiving the slide operation after the object group has been erased.

10. A non-transitory computer-readable storage medium storing therein a display control program, the display control program causing, in a display control device including a rectangular touch panel and a computer, the computer to:
display a plurality of objects on the touch panel, each of the objects corresponding to a plurality of characters;
receive a slide operation on any one object of the objects;
detect an end point of the slide operation;
determine one object from the objects according to the end point;
detect a first distance in a first direction from the determined one object to the end point;
upon reception of the slide operation, determine, according to the first distance, any one character of the characters corresponding to the determined one object and display the character on the touch panel; and
display the objects arranged in a second direction parallel to one side among peripheral sides of the touch panel, the second direction being orthogonal to the first direction;
display an object group on the touch panel;
arrange the objects in the object group in a grid;
display, when the slide operation performed on the object is received, a character string display area which includes an input character on the touch panel;
decide whether or not the number of characters included in the character string display area is equal to or larger than a specific number;
erases the object group when the number of characters is decided to be equal to or larger than the specific number; and
display the objects arranged in the second direction on the touch panel and receive the slide operation after the object group has been erased.

* * * * *